United States Patent
Kim

(10) Patent No.: US 11,393,367 B2
(45) Date of Patent: Jul. 19, 2022

(54) DISPLAY APPARATUS AND CONTROL METHOD FOR DISPLAY OF A VIRTUAL FLAT SCREEN

(71) Applicant: Samsung Electronics Co., Ltd., Suwon-si (KR)

(72) Inventor: Myoungwoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/180,630

(22) Filed: Feb. 19, 2021

(65) Prior Publication Data

US 2021/0256886 A1 Aug. 19, 2021

(30) Foreign Application Priority Data

Feb. 19, 2020 (KR) .................. 10-2020-0020285

(51) Int. Cl.
| | |
|---|---|
| *G06F 3/01* | (2006.01) |
| *G09G 3/00* | (2006.01) |
| *G06F 3/04886* | (2022.01) |
| *G09G 5/391* | (2006.01) |
| *G09G 5/32* | (2006.01) |

(52) U.S. Cl.
CPC ............ *G09G 3/002* (2013.01); *G06F 3/013* (2013.01); *G06F 3/04886* (2013.01); *G09G 5/32* (2013.01); *G09G 5/391* (2013.01); *G09G 2340/0407* (2013.01); *G09G 2340/0464* (2013.01)

(58) Field of Classification Search
CPC .. G09G 3/002; G09G 5/32; G09G 2340/0407; G09G 2340/0464; G09G 5/39; G06F 3/04886; G06F 3/013; G06F 1/1652; G06F 2203/04102
See application file for complete search history.

(56) References Cited

U.S. PATENT DOCUMENTS

| | | | |
|---|---|---|---|
| 5,796,401 | A | 8/1998 | Winer |
| 7,456,823 | B2 | 11/2008 | Poupyrev et al. |
| 9,633,413 | B2 | 4/2017 | Kim et al. |
| 10,097,801 | B2 | 10/2018 | Baker |
| 10,353,433 | B2 | 7/2019 | Park et al. |

(Continued)

FOREIGN PATENT DOCUMENTS

| | | |
|---|---|---|
| JP | 2015-154213 A | 8/2015 |
| KR | 10-2005-0098043 A | 10/2005 |

(Continued)

OTHER PUBLICATIONS

International Search Report and Written Opinion of the International Searching Authority dated May 27, 2021 in connection with International Application No. PCT/KR2021/001747, 6 pages.

*Primary Examiner* — Roy P Rabindranath

(57) ABSTRACT

A display apparatus is disclosed. The display apparatus includes a sensor, a display, and a processor. The processor is configured to generate a virtual flat screen based on an angle of the display identified through the sensor, correct a size of a content based on a distance between the virtual flat screen and the display, project the corrected content to a virtual space, map the content projected to the virtual space to the virtual flat screen, render the virtual flat screen that the content is mapped to, and display the rendered virtual flat screen on the display.

17 Claims, 16 Drawing Sheets

(56) References Cited

U.S. PATENT DOCUMENTS

| | | |
|---|---|---|
| 10,559,060 B2 | 2/2020 | Noh et al. |
| 11,068,074 B2 | 7/2021 | Lee et al. |
| 2012/0092363 A1* | 4/2012 | Kim .................... G06F 3/147 |
| | | 345/618 |
| 2015/0002531 A1 | 1/2015 | Park et al. |
| 2015/0221065 A1 | 8/2015 | Kim et al. |
| 2015/0234508 A1 | 8/2015 | Cho et al. |
| 2016/0034047 A1 | 2/2016 | Lee et al. |
| 2016/0093240 A1 | 3/2016 | Aurongzeb et al. |
| 2017/0345351 A1 | 11/2017 | Kwon et al. |
| 2018/0204304 A1 | 7/2018 | Noh et al. |
| 2019/0156791 A1 | 5/2019 | Lin |

FOREIGN PATENT DOCUMENTS

| | | |
|---|---|---|
| KR | 10-1258327 B1 | 4/2013 |
| KR | 20140094958 A | 7/2014 |
| KR | 10-2015-0092439 A | 8/2015 |
| KR | 10-2016-0037701 A | 4/2016 |
| KR | 10-1769704 B1 | 8/2017 |
| KR | 10-1772904 B1 | 9/2017 |
| KR | 10-1785066 B1 | 10/2017 |
| KR | 10-2109933 B1 | 5/2020 |

\* cited by examiner

FIG. 3

| h | Q |
|---|---|
| h1 | Q1 |
| h2 | Q2 |
| h3 | Q3 |
| ⋮ | ⋮ |
| hn | Qn |

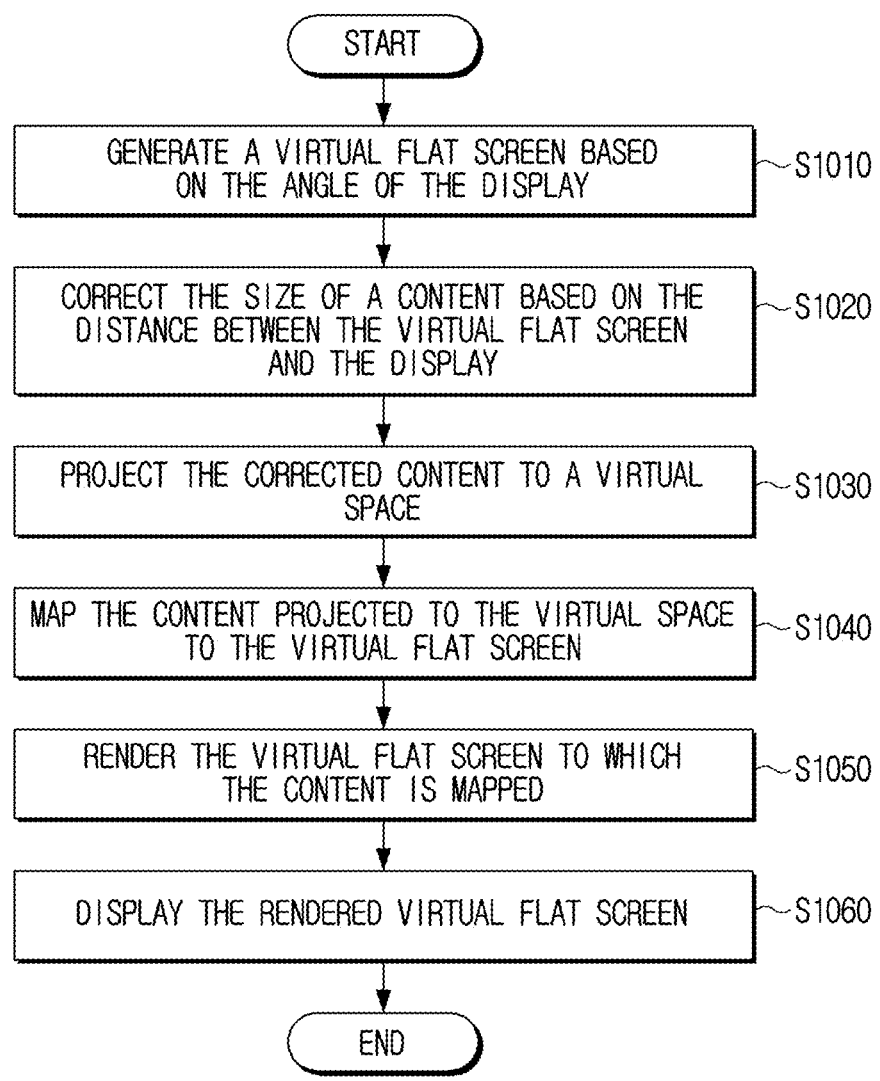

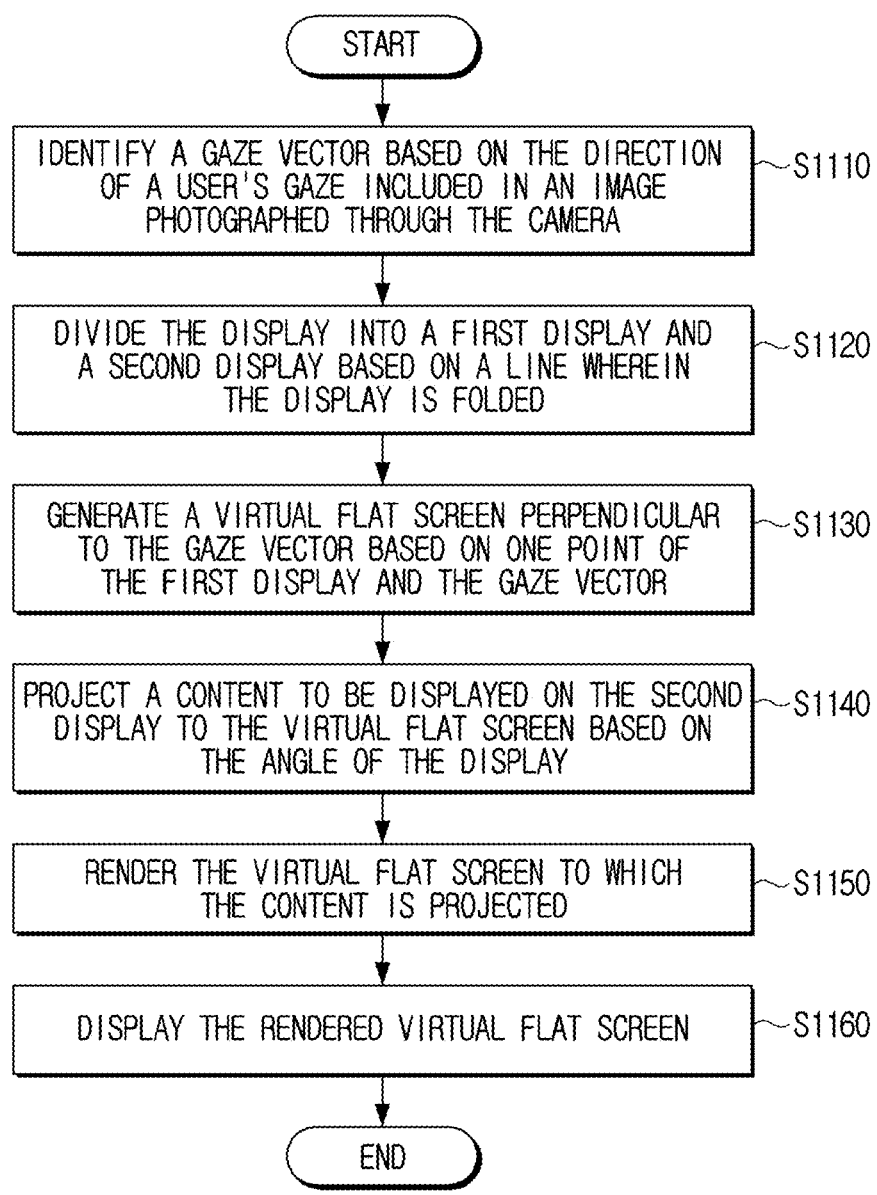

US 11,393,367 B2

DISPLAY APPARATUS AND CONTROL METHOD FOR DISPLAY OF A VIRTUAL FLAT SCREEN

CROSS-REFERENCE TO RELATED APPLICATION

This application is based on and claims priority under 35 U.S.C. § 119(a) of a Korean Patent Application No. 10-2020-0020285 filed on Feb. 19, 2020 in the Korean Intellectual Property Office, the disclosure of which is incorporated by reference herein in its entirety.

BACKGROUND

1. Field

The disclosure relates to a display apparatus and a control method thereof, and more particularly, to a foldable display apparatus and a control method thereof.

2. Description of Related Art

With the development of recent technologies, various electronic apparatuses are being developed. In particular, foldable display apparatuses wherein the flexible displays are mounted are being developed.

A foldable display apparatus is a display apparatus which can be folded or unfolded according to a user manipulation, and a user can use various functions provided by a foldable display apparatus while folding the foldable display apparatus by a specific angle. As an example, a user can view or manipulate a content displayed on a foldable display apparatus while folding the foldable display apparatus by a specific angle.

However, as a foldable display apparatus is folded by a specific angle, a content displayed on the foldable display apparatus may be viewed to be curved to a user. In this case, a user viewing or manipulating the content may feel visually inconvenienced.

SUMMARY

This disclosure was devised for addressing the aforementioned problem, and one purpose of this disclosure is for providing a display apparatus that can provide an uncurved screen to a user while it is folded by a specific angle, and a control method thereof.

A display apparatus according to an embodiment of this disclosure may include a sensor, a display, and a processor configured to generate a virtual flat screen based on an angle of the display identified through the sensor, correct a size of a content based on a distance between the virtual flat screen and the display, project the corrected content to a virtual space, map the content projected to the virtual space to the virtual flat screen, render the virtual flat screen to which the content is mapped, and display the rendered virtual flat screen on the display.

The display apparatus may further include a camera, and the processor may identify a user's pupil in an image photographed through the camera, identify the direction of the user's gaze based on a location of the identified user's pupil, rotate the virtual flat screen to which the content is mapped in a direction perpendicular to the direction of the user's gaze, and render the rotated virtual flat screen and display the rendered virtual flat screen on the display.

In addition, the processor may identify a rotating direction of the display based on a plurality of pulse signals of different phases received from the sensor, and identify the angle of the display based on the rotating direction and the number of the pulse signals received from the sensor.

Further, the processor may, based on a coordinate of a first point of the display, identify coordinates of second to fourth points based on the angle of the display, the horizontal length of the display, and the vertical length of the display, and generate the virtual flat screen based on the coordinates of the first to fourth points.

The processor may also identify a distance from the virtual flat screen to the display located in a vertical direction of the virtual flat screen, and correct the size of the content based on information on the identified distance and correction coefficients wherein different correction coefficients are matched for each distance.

In addition, the processor may correct the content to be larger as the distance value from the virtual flat screen to the display is larger.

Here, the virtual space to which the corrected content is projected may be a three-dimensional space having a form of a curved surface, and the processor may map the content projected to the three-dimensional space having a form of a curved surface to the virtual flat screen having a form of a two-dimensional flat surface based on a curved surface-flat surface mapping algorithm.

Further, the processor may, based on a gaze vector corresponding to the direction of the user's gaze, identify a first vector perpendicular to the gaze vector, and based on the first vector and a second vector corresponding to the virtual flat screen, identify the angle between the first and second vectors, and rotate the virtual flat screen based on the angle between the first and second vectors.

The processor may also, based on the angle between the first and second vectors being an angle exceeding a predetermined angle in the direction wherein the user's pupil was identified based on the second vector, rotate the virtual flat screen in the direction wherein the user's pupil was identified; and based on the angle between the first and second vectors being an angle exceeding a predetermined angle in an opposite direction to the direction wherein the user's pupil was identified based on the second vector, rotate the virtual flat screen in the opposition direction to the direction wherein the user's pupil was identified.

Meanwhile, a display apparatus according to an embodiment of the disclosure may include a sensor, a camera, a display, and a processor configured to, based on a direction of a user's gaze included in an image photographed through the camera, identify a gaze vector, divide the display into a first display and a second display based on a line wherein the display is folded, generate a virtual flat screen perpendicular to the gaze vector based on one point of the first display and the gaze vector, project a content to be displayed on the second display to the virtual flat screen based on the angle of the display identified through the sensor, render the virtual flat screen to which the content is projected, and display the rendered virtual flat screen on the display.

The processor may also identify a projection angle based on a difference between a predetermined angle and the angle of the display, and project the content to the virtual flat screen based on the projection angle.

In addition, the processor may project the content to the virtual flat screen rotated by the projection angle based on an axis corresponding to the folding line.

Meanwhile, a control method of a display apparatus according to an embodiment of the disclosure may include the steps of generating a virtual flat screen based on an angle of a display, correcting a size of a content based on a distance between the virtual flat screen and the display, projecting the corrected content to a virtual space, mapping the content projected to the virtual space to the virtual flat screen, and rendering the virtual flat screen to which the content is mapped, and displaying the rendered virtual flat screen on the display.

The control method of a display apparatus may further include the step of photographing a user, and in the step of displaying, the user's pupil may be identified in the photographed image, the direction of the user's gaze may be identified based on a location of the identified user's pupil, the virtual flat screen to which the content is mapped may be rotated in a direction perpendicular to the direction of the user's gaze, and the rotated virtual flat screen may be rendered and the rendered virtual flat screen may be displayed on the display.

In addition, in the step of identifying the angle, a rotating direction of the display may be identified based on a plurality of pulse signals of different phases received from the sensor; and the angle of the display may be identified based on the rotating direction and the number of the pulse signals received from the sensor.

Further, in the step of generating, based on a coordinate of a first point of the display, coordinates of second to fourth points may be identified based on the angle of the display, the horizontal length of the display, and the vertical length of the display. The virtual flat screen may be generated based on the coordinates of the first to fourth points.

In the step of correcting, a distance from the virtual flat screen to the display located in a vertical direction of the virtual flat screen may be identified, and the size of the content may be corrected based on information on the identified distance and correction coefficients, wherein different correction coefficients are matched for each distance.

In addition, in the step of correcting, the content may be corrected to be larger as the distance value from the virtual flat screen to the display is larger.

Here, the virtual space to which the corrected content is projected may be a three-dimensional space having a form of a curved surface. In the step of mapping, the content projected to the three-dimensional space having a form of a curved surface may be mapped to the virtual flat screen having a form of a two-dimensional flat surface based on a curved surface-flat surface mapping algorithm.

Further, in the step of rotating, based on a gaze vector corresponding to the direction of the user's gaze, a first vector perpendicular to the gaze vector may be identified, and based on the first vector and a second vector corresponding to the virtual flat screen, the angle between the first and second vectors may be identified, and the virtual flat screen may be rotated based on the angle between the first and second vectors.

According to the various embodiments of the disclosure as above, a display apparatus that can provide an uncurved screen to a user while it is folded by a specific angle, and a control method thereof can be provided.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 illustrates a diagram for illustrating information on correction coefficients according to an embodiment of the disclosure;

FIG. 10 illustrates a flow chart for illustrating an operation of a display apparatus according to an embodiment of the disclosure; and FIG. 11 illustrates a flow chart for illustrating an operation of a display apparatus according to an embodiment of the disclosure.

DETAILED DESCRIPTION

Figure 1:
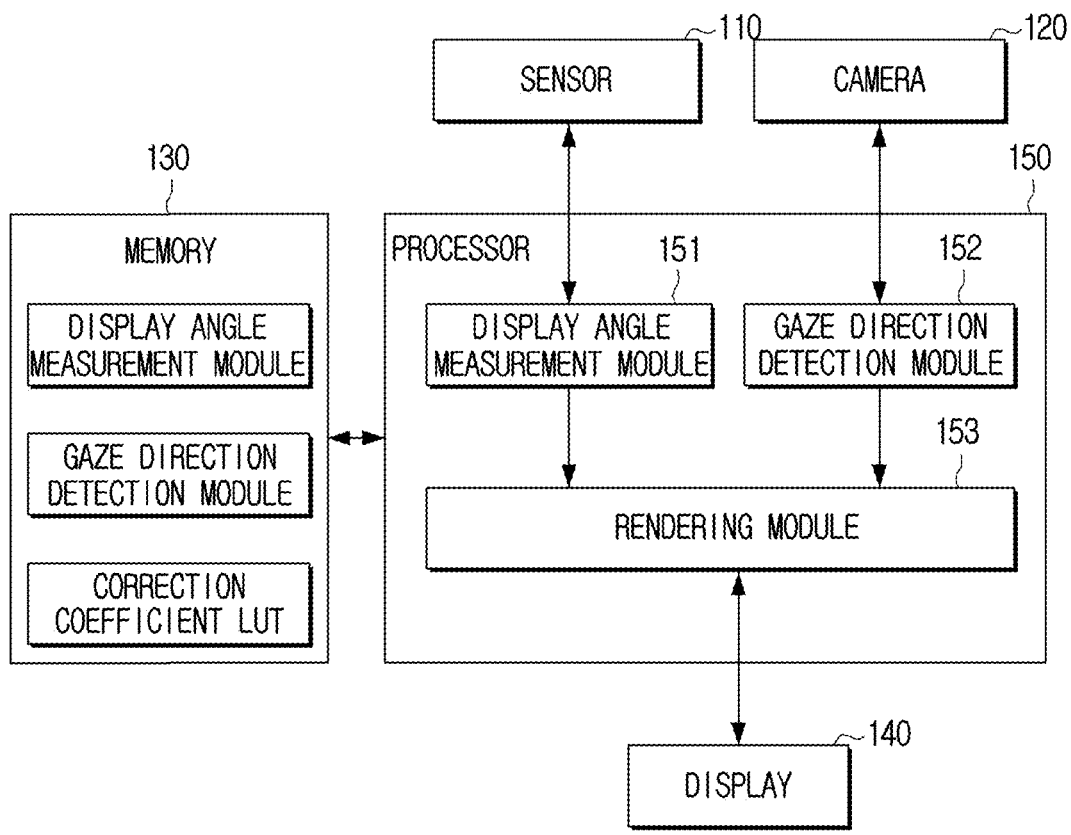
FIG. 1 illustrates a block diagram for illustrating a display apparatus according to an embodiment of the disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described with reference to the accompanying drawings. However, it should be noted that the various embodiments are not for limiting the technology described in the disclosure to a specific embodiment, but they should be interpreted to include various modifications, equivalents, and/or alternatives of the embodiments of the disclosure. Also, with respect to the detailed description of the drawings, similar components may be designated by similar reference numerals.

In the disclosure, expressions such as "have," "may have," "include," and "may include" should be construed as denoting that there are such characteristics (e.g.: elements such as numerical values, functions, operations, and components), and the expressions are not intended to exclude the existence of additional characteristics.

Also, in the disclosure, the expressions "A or B," "at least one of A and/or B," or "one or more of A and/or B" and the like may include all possible combinations of the listed items. For example, "A or B," "at least one of A and B," or "at least one of A or B" may refer to all the following cases: (1) including at least one A, (2) including at least one B, or (3) including at least one A and at least one B.

Further, the expressions "first," "second," and the like used in the disclosure may be used to describe various elements regardless of any order and/or degree of importance. Also, such expressions are used only to distinguish one element from another element, and are not intended to limit the elements.

Meanwhile, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element). In contrast, the description that one element (e.g.: a first element) is "directly coupled" or "directly connected" to another element (e.g.: a second element) can be interpreted to mean that still another element (e.g.: a third element) does not exist between the one element and the another element.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily mean that a device is "specifically designed to" in terms of hardware. Instead, under some circumstances, the expression "a device configured to" may mean that the device "is capable of" performing an operation together with another device or component. For example, the phrase "a processor configured to perform A, B, and C" may mean a dedicated processor (e.g.: an embedded processor) for performing the corresponding operations, or a generic-purpose processor (e.g.: a CPU or an application processor) that can perform the corresponding operations by executing one or more software programs stored in a memory device.

In addition, in the disclosure, "a module" or "a part" performs at least one function or operation, and it may be implemented as hardware or software, or as a combination of hardware and software. Further, a plurality of "modules" or "parts" may be integrated into at least one module and implemented as at least one processor (not shown), except "modules" or "parts" that need to be implemented as specific hardware.

Hereinafter, the disclosure will be described in detail with reference to the accompanying drawings.

FIG. 1 illustrates a block diagram for illustrating a display apparatus according to an embodiment of the disclosure.

A display apparatus 100 according to an embodiment of the disclosure may be a foldable display apparatus. In this example, the display apparatus 100 may include a display 140 that can be folded (e.g., a flexible display), and a hinge for folding the display 140 from the upper side to the lower side, or from the lower side to the upper side. Here, the hinge is a component including a circular gear consisting of a plurality of crews; and if a user applies force to the display 140 for folding the display 140, the circular gear of the hinge rotates, and accordingly, the display 140 may be folded. As an example, if a user applies force to the display 140 for folding the display 140, the circular gear may rotate in a counter-clockwise direction, and accordingly, the display 140 may be folded.

Referring to FIG. 1, the display apparatus 100 according to an embodiment of the disclosure may include a sensor 110, a camera 120, a memory 130, a display 140, and a processor 150. Note that this is a configuration according to an embodiment, and depending on various embodiments according to this disclosure, the display apparatus 100 may further include components other than the aforementioned components, or with some of the components among the aforementioned components being omitted.

The processor 150 may identify the angle of the display 140 by loading a display angle measurement module 151 stored in the memory 130.

Specifically, the processor 150 may identify the angle of the display 140 based on sensing data received from the sensor 110.

Here, the sensor 110 is a component outputting pulse signals in case the circular gear included in the hinge rotates, and it may be implemented as an encoder.

Specifically, the sensor 110 may be implemented as an encoder including a plurality of light emitting diodes (e.g., LEDs), a rotation disc including a plurality of slots, and a plurality of light receiving diodes (e.g., photodiodes), and it may be coupled to the circular gear of the hinge. Also, as the circular gear of the hinge rotates, if lights output by the plurality of light emitting diodes pass through the slots of the rotation disc and reach the plurality of light receiving diodes, the sensor 110 may output a plurality of pulse signals.

Next, the processor 150 may identify the angle of the display 140 based on the number of the pulse signals received from the sensor 110. Specifically, the processor 150 may identify the angle which is a value of multiplying the number of the pulse signals received from the sensor 110 with a predetermined angle as the angle of the display 140. As an example, in a case in which a predetermined angle is a°, if n pulse signals are received from the sensor 110, the processor 150 may identify the angle of the display 140 as (a×n)°. For this, the memory 130 may store information on the predetermined angle.

Meanwhile, based on the plurality of pulse signals of different phases received from the sensor 110, the processor 150 may identify the rotating direction of the circular gear. As described above, the sensor 110 may output lights through the plurality of light emitting diodes. In this case, a light output by a first light emitting diode among the plurality of light emitting diodes passes through the slot of the rotation disc and reaches a first light receiving diode, the sensor 110 may output a pulse signal of an A phase. In a case in which a light output by a second light emitting diode among the plurality of light emitting diodes passes through the slot of the rotation disc and reaches a second light receiving diode, the sensor 110 may output a pulse signal of a B phase. For this example, the first light emitting diode and the second light emitting diode of the sensor 110 may be arranged in different locations and output lights toward the rotation disc, and the first light receiving diode may be arranged in a location wherein a light output by the first light emitting diode can be received, and the second light receiving diode may be arranged in a location wherein a light output by the second light emitting diode can be received.

Next, based on the phase difference between the pulse signal of the A phase and the pulse signal of the B phase, the processor 150 may identify the rotating direction of the circular gear. Specifically, if the phase of the pulse signal of the A phase is higher than the phase of the pulse signal of the B phase by 90°, the processor 150 may identify that the circular gear rotates in a clockwise direction; and if the phase of the pulse signal of the B phase is higher than the phase of the pulse signal of the A phase by 90°, the processor 150 may identify that the circular gear rotates in a counter-clockwise direction.

Accordingly, the processor 150 may identify the angle of the display 140 in further consideration of the rotating direction of the circular gear. Specifically, the processor 150 may identify the rotating direction of the circular gear based on the phase difference between the pulse signal of the A phase and the pulse signal of the B phase received from the sensor 110; and if the circular gear rotates in a counter-clockwise direction, the processor 150 may identify an angle which is a value of multiplying the number of the pulse signals received from the sensor 110 with a predetermined angle as the angle of the display 140; and if the circular gear rotates in a counter-clockwise direction and then rotates in a clockwise direction, the processor 150 may identify the difference between an angle which is a value of multiplying the number of the pulse signals received until the phase of the pulse signal of the A phase becomes higher than the phase of the pulse signal of the B phase by 90° with a predetermined angle and an angle which is a value of multiplying the number of the pulse signals received after the phase of the pulse signal of the B phase becomes higher than the phase of the pulse signal of the A phase by 90° as the angle of the display 140.

When the angle of the display 140 is identified, the processor 150 may load the rendering module 153 stored in the memory 130, and thereby render a content.

Specifically, the processor 150 may correct a size of a content based on a distance from the display 140 to a virtual flat screen, project the content having the corrected size to a virtual space P, map the content projected to the virtual space P to the virtual flat screen, and render the content mapped to the virtual flat screen and display the content on the display 140.

For this, the processor 150 may first generate a virtual flat screen based on the angle of the display 140. Specifically, the processor 150 may generate a virtual flat screen based on the angle of the display 140 and the horizontal and vertical lengths of the display 140. Explanation in this regard will be made with reference to FIG. 2A.

Figure 2A:
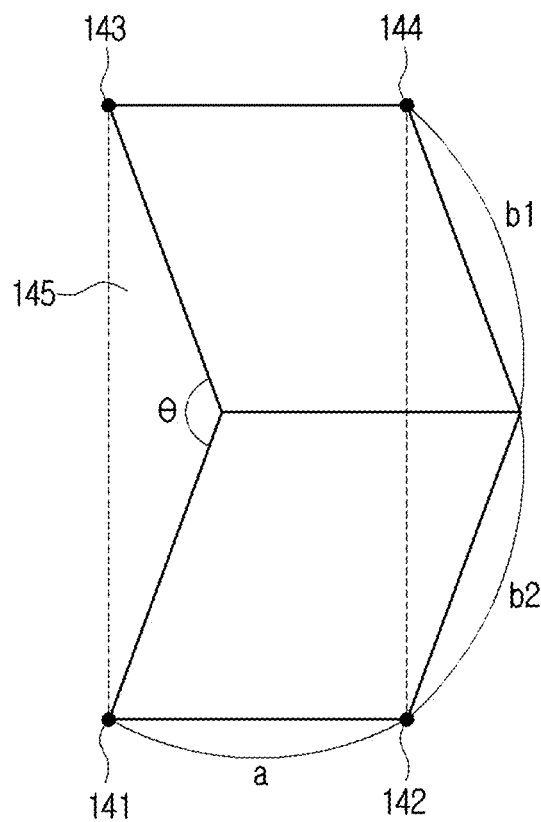
FIG. 2A illustrates a diagram illustrating a display apparatus in a folded state according to an embodiment of the disclosure.

Referring to FIG. 2A, based on the angle $\theta$ of the display 140, the horizontal length a cm (hereinafter, the unit will be omitted) of the display 140 and the vertical length b of the display 140 (here, b=b1+b2, and b1 may be the vertical length of the display 140 located in the upper part based on the folding line when the display 140 is folded, and b2 may be the vertical length of the display 140 located in the lower part based on the folding line when the display 140 is folded), the processor 150 may set the coordinates of the four points 141, 142, 143, 144 including the reference point 141.

Specifically, the processor 150 may set the coordinate of the point 1 (141) which is the reference point 141 as (0, 0), set the coordinate of the point 2 (142) as the coordinate (a, 0) based on the horizontal length of the display 140, set the coordinate of the point 3 (143) as (0, b-k) based on the vertical length of the display 140 and the angle of the display 140, and set the coordinate of the point 4 (144) as (a, b-k) based on the horizontal length and the vertical length of the display 140 and the angle of the display 140.

Here, the coordinate b-k of the y axis of the points 3, 4 (143, 144) may be calculated through triangulation. Explanation in this regard will be made with reference to FIG. 2B.

Figure 2B:
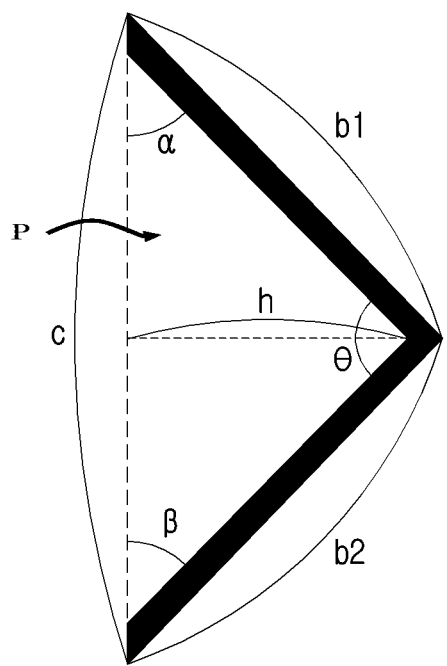
FIG. 2B illustrates a diagram illustrating a side surface of a display apparatus in a folded state according to an embodiment of the disclosure.

Referring to FIG. 2B, when the display apparatus 100 in a folded state is viewed from the side surface, the vertical length of the virtual flat screen 145 may be c. Also, the angle between the display 140 located in the upper part based on the folding line and the virtual flat screen 145 may be $\alpha$, and the angle between the display 140 located in the lower part based on the folding line and the virtual flat screen 145 may be $\beta$.

In this case, through triangulation, the processor 150 may acquire a formula such as $b1/\sin \beta = b2/\sin \alpha = c/\sin \theta$ (here, b1 may be the vertical length of the display 140 located in the upper part based on the folding line when the display 140 is folded, b2 may be the vertical length of the display 140 located in the lower part based on the folding line when the display 140 is folded, $\theta$ may be the angle of the display 140, c may be the vertical length of the virtual flat screen 145, a may be the angle between the display 140 located in the upper part based on the folding line and the virtual flat screen 145, and β may be the angle between the display 140 located in the lower part based on the folding line when the display 140 is folded and the virtual flat screen 145).

Next, based on the formula 1: b1 sin α=b2 sin β, formula 2: b2 sin θ=c sin α, and formula 3: b1 sin θ=c sin β, and the angle θ of the display 140, the vertical length b1 of the display 140 located in the upper part based on the folding line, and the vertical length b2 of the display 140 located in the lower part based on the folding line, the processor 150 may calculate the vertical length c of the virtual flat screen 145, the angle α between the display 140 located in the upper part based on the folding line and the virtual flat surface, and the angle β between the display 140 located in the lower part based on the folding line and the virtual flat surface.

Next, the processor 150 may calculate the vertical length of the virtual flat screen 145 by summing up b1 cos α and b2 cos β. Here, the value of summing up b1 cos α and b2 cos β becomes the aforementioned coordinate b-k of the y axis of the points 3, 4 (143, 144).

If the virtual flat screen 145 is generated based on the points 1, 2, 3, 4 (141, 142, 143, 144) (i.e., if the virtual flat screen 145 wherein the point 1 and the point 2, the point 2 and the point 3, the point 3 and the point 4, and the point 4 and the point 1 are connected is generated), the processor 150 may project a content to the virtual space P based on the distance between the virtual flat screen 145 and the display 140.

For this, the processor 150 may identify the distance between the virtual flat screen 145 and the display 140. Explanation in this regard will be made with reference to FIG. 2C.

Figure 2C:
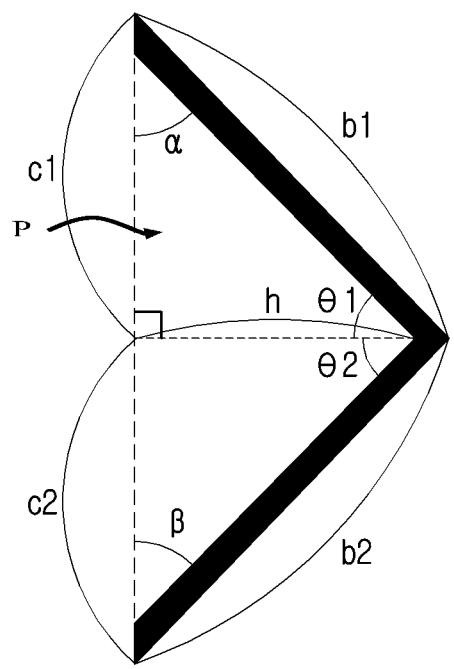
FIG. 2C illustrates a diagram illustrating a side surface of a display apparatus in a folded state according to an embodiment of the disclosure.

Referring to FIG. 2C, the processor 150 may calculate a distance H from the virtual flat screen 145 to the display 140 located in the vertical direction of the virtual flat screen 145.

For this, through triangulation, the processor 150 may acquire a formula such as b1/sin 90°=h/sin α=c1/sin θ1 (here, b1 may be the vertical length of the display 140 located in the upper part based on the folding line when the display 140 is folded, h may be the vertical distance from the virtual flat screen 145 to the display 140, θ1 may be the angle between a virtual flat surface perpendicular to the virtual flat screen 145 and the display 140 located in the upper part based on the folding line, a may be the angle between the display 140 located in the upper part based on the folding line and the virtual flat surface, and c1 may be the distance from the point that descended as much as the vertical distance h in the virtual flat screen 145 to the point located on the uppermost end in the virtual flat screen 145 (i.e., the point wherein the coordinate of the y axis is the aforementioned b-k).

Next, based on the formula 1: b1 sin α=h sin 90°, formula 2: h sin θ1=c1 sin α, and formula 3: b1 sin θ1=c1 sin 90°, and the vertical length b1 of the display 140 located in the upper part based on the folding line, and the angle α between the display 140 located in the upper part based on the folding line and the virtual flat surface, the processor 150 may calculate the vertical distance h between the virtual flat screen 145 and the display 140.

Also, through triangulation, the processor 150 may acquire a formula such as b2/sin 90°=h/sin β=c2/sin θ2 (here, b2 may be the vertical length of the display 140 located in the lower part based on the folding line, h may be the vertical distance from the virtual flat screen 145 to the display 140, θ2 may be the angle between the virtual flat surface perpendicular to the virtual flat screen 145 and the display 140 located in the lower part based on the folding line, β may be the angle between the display 140 located in the lower part based on the folding line and the virtual flat surface, and c2 may be the distance from the point that descended as much as the vertical distance h in the virtual flat screen 145 to the point located on the lowermost end in the virtual flat screen 145).

Next, based on the formula 1: b2 sin β=h sin 90°, formula 2: h sin θ2=c2 sin β, and formula 3: b2 sin θ2=c2 sin 90°, and the vertical length b2 of the display 140 located in the lower part based on the folding line, and the angle β between the display 140 located in the lower part based on the folding line and the virtual flat surface, the processor 150 may calculate the vertical distance h between the virtual flat screen 145 and the display 140.

In FIG. 2C, one length h is illustrated, but the display 140 may include a plurality of pixels; and the processor 150 may calculate a plurality of distances from the virtual flat screen 145 to the plurality of pixels located in a vertical direction of the virtual flat screen 145 based on the aforementioned triangular measurement method.

Next, the processor 150 may project a content to a virtual space P based on the distance between the virtual flat screen 145 and the display 140.

Specifically, the processor 150 may correct a size of a content based on information on correction coefficients wherein different correction coefficients are matched for each distance between the virtual flat screen 145 and the display 140, and project the content having the corrected size to the virtual space P.

Figure 3:
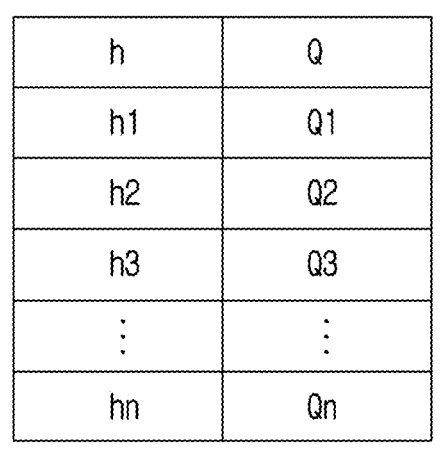

As an example, the memory 130 according to an embodiment of the disclosure may store information on correction coefficients (i.e., correction coefficients LUT) as in FIG. 3.

In this case, if the vertical distance from the virtual flat screen 145 to the first pixel of the display 140 is h1, the processor 150 may correct the size of a content corresponding to the first pixel by Q1 times, and project the content having the size corrected by Q1 times to the virtual space P. In a similar manner thereto, if the distance from the virtual flat screen 145 to the second pixel of the display 140 is h2, the processor 150 may correct the size of a content corresponding to the second pixel by Q2 times, and project the content having the size corrected by Q2 times to the virtual space P, and if the distance from the virtual flat screen 145 to the nth pixel of the display 140 is hn, the processor 150 may correct the size of a content corresponding to the nth pixel by Qn times, and project the content having the size corrected by Qn times to the virtual space P. That is, the processor 150 may correct the size of a content corresponding to each of the first to nth pixels based on a correction coefficient Q, and project the content having the corrected size to the virtual space P.

Meanwhile, in FIG. 3, the correction coefficient Q is bigger than 1, and may have a bigger size as the vertical distance h becomes bigger. Accordingly, the processor 150 may correct a content to be bigger as the vertical distance h is bigger.

Also, as the correction coefficient Q is bigger than 1 and has a bigger size as the vertical distance h becomes bigger, the shape of the virtual space P to which a corrected content is projected may be a curved surface. That is, the virtual space P may be a three-dimensional space having a shape of a curved surface.

Accordingly, the processor 150 may perform a job of mapping a content projected to the virtual space P to the virtual flat screen 145. That is, the processor 150 may map a content projected to a three-dimensional space having a shape of a curved surface to the virtual flat screen 145 having a shape of a two-dimensional flat surface. Specifically, the processor 150 may map a content projected to the virtual space P to the virtual flat screen 145 based on a curved surface-flat surface mapping algorithm. Here, the curved surface-flat surface mapping algorithm is an algorithm for converting a three-dimensional curved surface to a two-dimensional flat surface, and it may be a parameterization polygonal mesh algorithm. In this case, the processor 150 may divide a content projected to the virtual space P into a plurality of areas through a polygonal mesh, and map the content divided into a plurality of areas to different areas of the virtual flat screen 145.

Accordingly, the processor 150 may acquire the virtual flat screen 145 to which a content having a size corrected based on the aforementioned vertical distance h and correction coefficient Q is mapped.

Next, the processor 150 may render the virtual flat screen 145 to which a content having a corrected size is mapped to display the screen on the display 140, and display the rendered virtual flat screen 145 on the display 140.

As described above, in the disclosure, a content is corrected to different sizes according to a folding angle of the display 140, and the virtual flat screen 145 to which the content in the corrected size is mapped is rendered and displayed on the display 140, and accordingly, a user may be provided with a content in an uncurved form even in a state wherein the display 140 is folded.

Meanwhile, the processor 150 may render a content in further consideration of a direction of a user's gaze. Explanation in this regard will be made with reference to FIG. 4.

The processor 150 may rotate the virtual flat screen 145 based on a direction of a user's gaze, render the rotated virtual flat screen 145' to display the screen on the display 140, and display the rendered virtual flat screen 145' on the display 140.

For this, the processor 150 may identify a direction of a user's gaze by loading a gaze direction detection module 152 stored in the memory 130.

Specifically, the processor 150 may identify a user's pupil in an image photographed through the camera 120 through an object detection algorithm, and identify the direction of the user's gaze based on the location of the identified user's pupil.

Here, the direction of the user's gaze may be expressed with a gaze vector. Specifically, the direction of the user's gaze is a direction which a virtual line connecting from the center point of the eyeball to the center point of the pupil is toward, and the processor 150 may calculate a point which proceeded toward the inside of the eyeball from the point wherein the user's pupil is located as much as the radius of the eyeball as the center point of the eyeball, and acquire a virtual line connecting from the center point of the eyeball to the center point of the user's pupil as the gaze vector of the user. For this, the processor 150 may store information on the radius of the eyeball (e.g., 12 mm).

Next, the processor 150 may acquire a vector which is perpendicular to the user's gaze vector through a dot product of vectors. Specifically, if the user's gaze vector acquired based on the direction of the user's gaze is V1=(X1, Y1, Z1), and a vector perpendicular to the user's gaze vector is V2=(X2, Y2, Z2), through a formula: V1 dot V2=|V1||V2| cos θ3=0 (here, θ3 is the angle between the user's gaze vector V1 and the vector perpendicular to the user's gaze vector V2, and the gaze vector V1 and the vertical vector V2 is in a vertical relation, and thus V1 dot V2=0), the processor 150 may acquire the vector V2 perpendicular to the user's gaze vector V1 (here, V2=(Y1, −X1, 0)).

Next, the processor 150 may identify an angle between a vector corresponding to the virtual flat screen 145 and the vector perpendicular to the user's gaze vector. Here, the vector corresponding to the virtual flat screen 145 may be acquired based on the reference point 141 and at least one point on the virtual flat screen 145. Specifically, based on the reference point (0, 0, 0) and one point on the virtual flat screen 145 (X3, Y3, Z3) (here, the coordinate of the one point may be determined as an optional one point based on the horizontal and vertical lengths of the display 140 and the angle of the display 140), the processor 150 may acquire a vector V3 corresponding to the virtual flat screen 145 (here, V3=(X3, Y3, Z3)), and identify the angle between the vector corresponding to the virtual flat screen 145 and the vector perpendicular to the user's gaze vector through a dot product of vectors. That is, through a dot product of the vector V2 perpendicular to the user's gaze vector V1 (here, V2=(Y1, −X1, 0)) and the vector V3 corresponding to the virtual flat screen 145 (here, V3=(X3, Y3, Z3)), the processor 150 may acquire a formula: θ4=cos$^{-1}$ (V2 dot V3/(|V2||V3|)) (here, θ4 is an angle between the vector V2 perpendicular to the user's gaze vector V1 and the vector V3 corresponding to the virtual flat screen 145), and identify θ4 through the aforementioned formula operation.

Next, based on the angle θ between the vector V2 perpendicular to the user's gaze vector V1 and the vector V3 corresponding to the virtual flat screen 145, the processor 150 may rotate the virtual flat screen 145 in a direction perpendicular to the direction of the user's gaze. As an example, referring to FIG. 4, the processor 150 may rotate the virtual flat screen 145 by the aforementioned angle θ4 based on the horizontal axis of the display 140 including the reference point, and thereby acquire the virtual flat screen 145' perpendicular to the direction of the user's gaze.

Next, the processor 150 may render the virtual flat screen 145' rotated in a direction perpendicular to the direction of the user's gaze, and display the rendered virtual flat screen 145' on the display 140.

Accordingly, the user may be provided with a content in an uncurved form even in a state wherein the display 140 is folded.

Meanwhile, in the above, explanation was made based on a case wherein the display 140 is folded from the upper side to the lower side, or from the lower side to the upper side, but the technical idea of the disclosure can be deemed to be also applied to a case wherein the display 140 is folded from the left side to the right side, or from the right side to the left side.

Figure 5A:
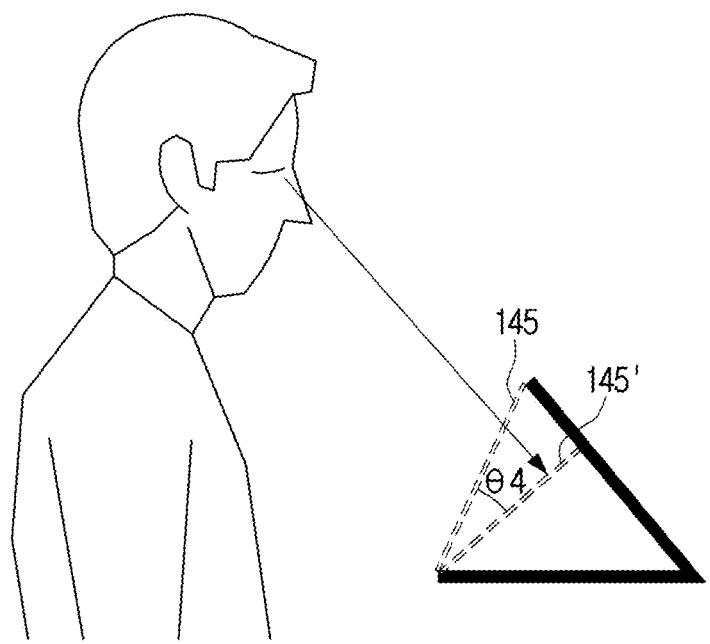
FIG. 5A illustrates a diagram for illustrating an embodiment of rotating a virtual flat screen according to an embodiment of the disclosure.
Figure 5B:
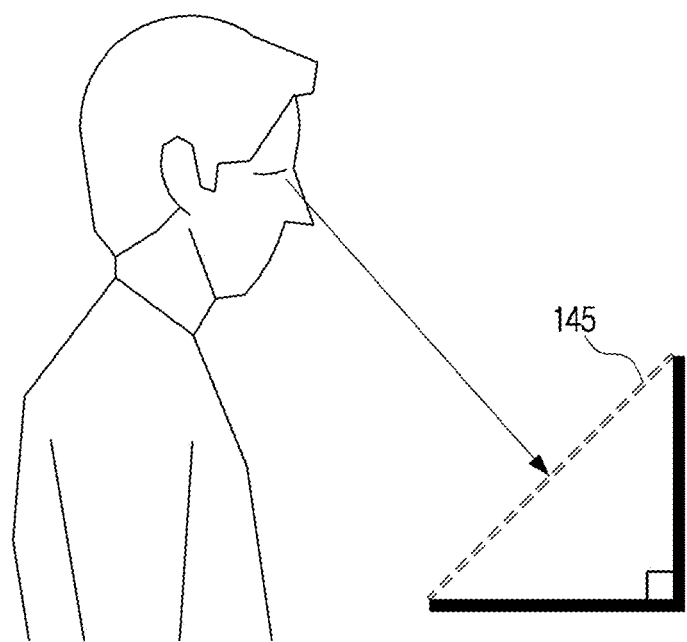
FIG. 5B illustrates a diagram for illustrating an embodiment of not rotating a virtual flat screen according to an embodiment of the disclosure.
Figure 5C:
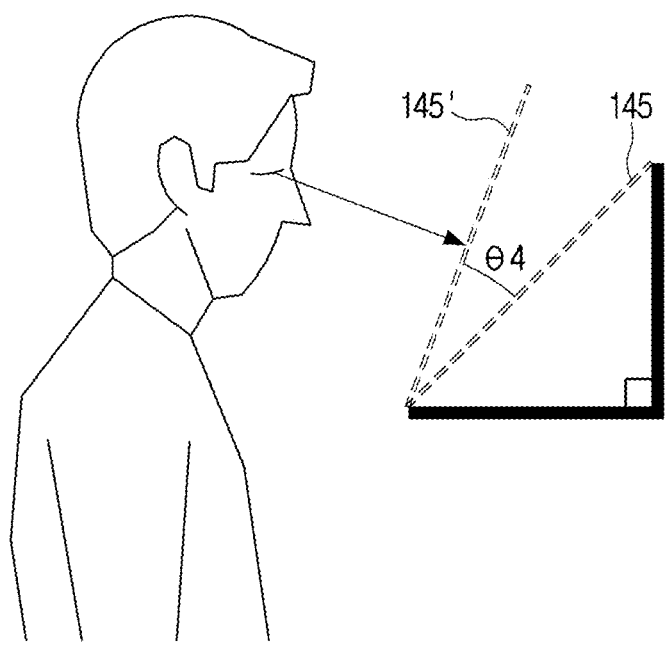
FIG. 5C illustrates a diagram for illustrating an embodiment of rotating a virtual flat screen according to an embodiment of the disclosure.

FIG. 5A to FIG. 5C illustrate diagrams for example embodiments wherein a display apparatus according to an embodiment of the disclosure provides a content in an uncurved form. Hereinafter, for the convenience of explanation, explanation will be made based on the assumption that the angle between the vector V2 perpendicular to the user's gaze vector V1 and the vector V3 corresponding to the virtual flat screen 145 is θ4.

As described above, the processor 150 may rotate the virtual flat screen 145 in a direction perpendicular to the gaze vector. Specifically, if it is identified that the aforementioned angle θ4 is an angle exceeding a predetermined angle (e.g., 0 degree) in the direction wherein the user's pupil was identified based on the vector V3, the processor 150 may rotate the virtual flat screen 145 by the angle θ in the direction wherein the user's pupil was identified; and if it is identified that the angle θ4 is an angle exceeding a predetermined angle (e.g., 0 degree) in an opposite direction to the direction wherein the user's pupil was identified based on the vector V3, the processor 150 may rotate the virtual flat screen 145 by the angle θ in an opposite direction to the direction wherein the user's pupil was identified.

Figure 4:
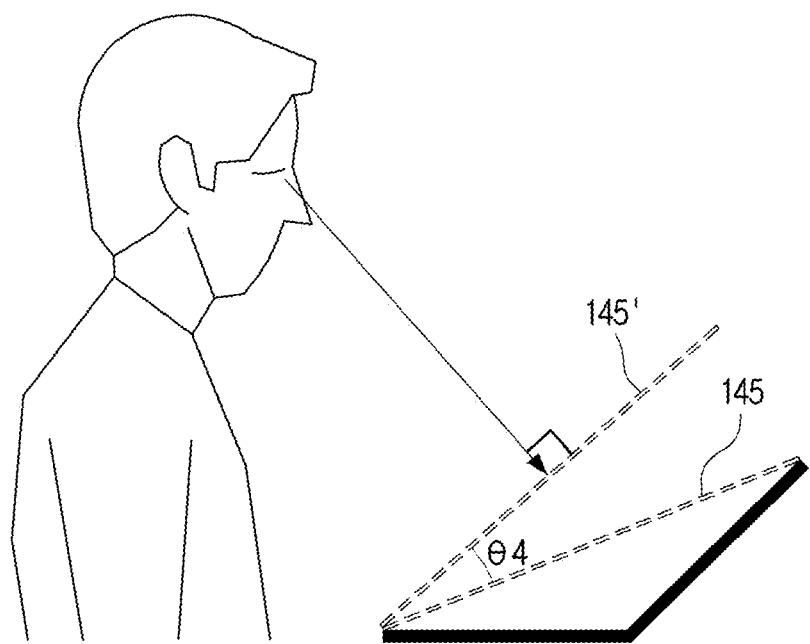
FIG. 4 illustrates a diagram for illustrating an embodiment of projecting a content based on a gaze vector according to an embodiment of the disclosure.

As an example, as illustrated in FIG. 4, if the angle θ is an angle exceeding 0 degree in the direction wherein the user's pupil was identified based on the vector V3, the processor 150 may rotate the virtual flat screen 145 by the aforementioned angle θ4 in the direction wherein the user's pupil was identified based on the horizontal axis of the display 140 including the reference point, and thereby acquire the virtual flat screen 145' perpendicular to the direction of the user's gaze. Next, the processor 150 may render the virtual flat screen 145' rotated in a direction perpendicular to the direction of the user's gaze, and display the rendered virtual flat screen 145' on the display 140.

Alternatively, as illustrated in FIG. 5A, if the angle θ is an angle exceeding 0 degree in an opposite direction to the direction wherein the user's pupil was identified based on the vector V3, the processor 150 may rotate the virtual flat screen 145 by the aforementioned angle θ4 in an opposite direction to the direction wherein the user's pupil was identified based on the horizontal axis of the display 140 including the reference point, and thereby acquire the virtual flat screen 145' perpendicular to the direction of the user's gaze. Next, the processor 150 may render the virtual flat screen 145' rotated in a direction perpendicular to the direction of the user's gaze, and display the rendered virtual flat screen 145' on the display 140.

Alternatively, if the angle θ4 is a predetermined angle (e.g., 0 degree), as illustrated in FIG. 5B, the processor 150 may not rotate the virtual flat screen 145, and render the virtual flat screen 145 and display the screen on the display 140.

Accordingly, no matter by which angle the display 140 is folded, the user may be provided with a content in an uncurved form.

Note that the aforementioned example is merely an embodiment, and depending on embodiments, if the aforementioned angle θ4 is an angle exceeding a predetermined angle (e.g., 0 degree) in the direction wherein the user's pupil was identified based on the vector V3, the processor 150 may rotate the virtual flat screen 145 by the angle θ in the direction wherein the user's pupil was identified; and if the angle θ4 is an angle exceeding a predetermined angle (e.g., 0 degree) in an opposite direction to the direction wherein the user's pupil was identified based on the vector V3, the processor 150 may rotate the virtual flat screen 145 by the angle θ in an opposite direction to the direction wherein the user's pupil was identified.

Note that the aforementioned embodiment is an embodiment for a case in which the angle of the display 140 is changed while there is no change to the location of the display apparatus, and the display apparatus 100 according to an embodiment of the disclosure may be provided with a content in an uncurved form if the location of the display apparatus is changed from the first location to the second location while there is no change to the angle of the display 140.

As an example, if the display apparatus 100 folded by a specific angle in the first location as illustrated in FIG. 5B is moved to the second location as illustrated in FIG. 5C, the processor 150 may identify the angle θ4 between the vector V2 perpendicular to the user's gaze vector V1 and the vector V3 corresponding to the virtual flat screen 145 in the second location. Next, if it is identified that the angle θ4 is an angle exceeding a predetermined angle (e.g., 0 degree) in the direction wherein the user's pupil was identified based on the vector V3, the processor 150 may rotate the virtual flat screen 145 by the aforementioned angle θ4 in the direction wherein the user's pupil was identified based on the horizontal axis of the display 140 including the reference point, and thereby acquire the virtual flat screen 145' perpendicular to the direction of the user's gaze. Next, the processor 150 may render the virtual flat screen 145' rotated in a direction perpendicular to the direction of the user's gaze, and display the rendered virtual flat screen 145' on the display 140. Alternatively, if it is identified that the angle θ4 is an angle exceeding a predetermined angle (e.g., 0 degree) in an opposite direction to the direction wherein the user's pupil was identified based on the vector V3, the processor 150 may rotate the virtual flat screen 145 by the aforementioned angle θ4 in an opposite direction to the direction wherein the user's pupil was identified based on the horizontal axis of the display 140 including the reference point, and thereby acquire the virtual flat screen 145' perpendicular to the direction of the user's gaze. Next, the processor 150 may render the virtual flat screen 145' rotated in a direction perpendicular to the direction of the user's gaze, and display the rendered virtual flat screen 145' on the display 140.

Meanwhile, in the above, an embodiment of displaying a screen based on a content of which size was corrected based on a correction coefficient was explained. However, this is merely an embodiment, and the display apparatus 100 according to an embodiment of the disclosure may provide a content in an uncurved form without correcting the size of a content. Hereinafter, explanation in this regard will be made with reference to FIG. 6 and FIG. 7.

Figure 6:
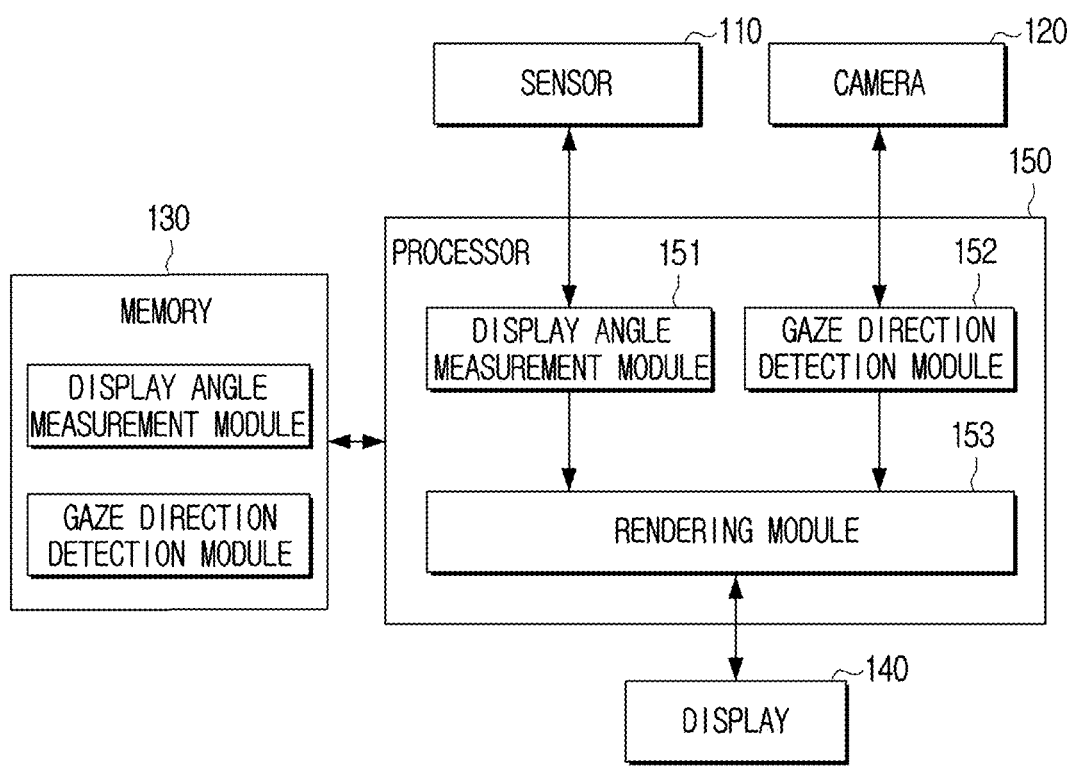
FIG. 6 illustrates a block diagram for illustrating a display apparatus according to an embodiment of the disclosure.
Figure 7:
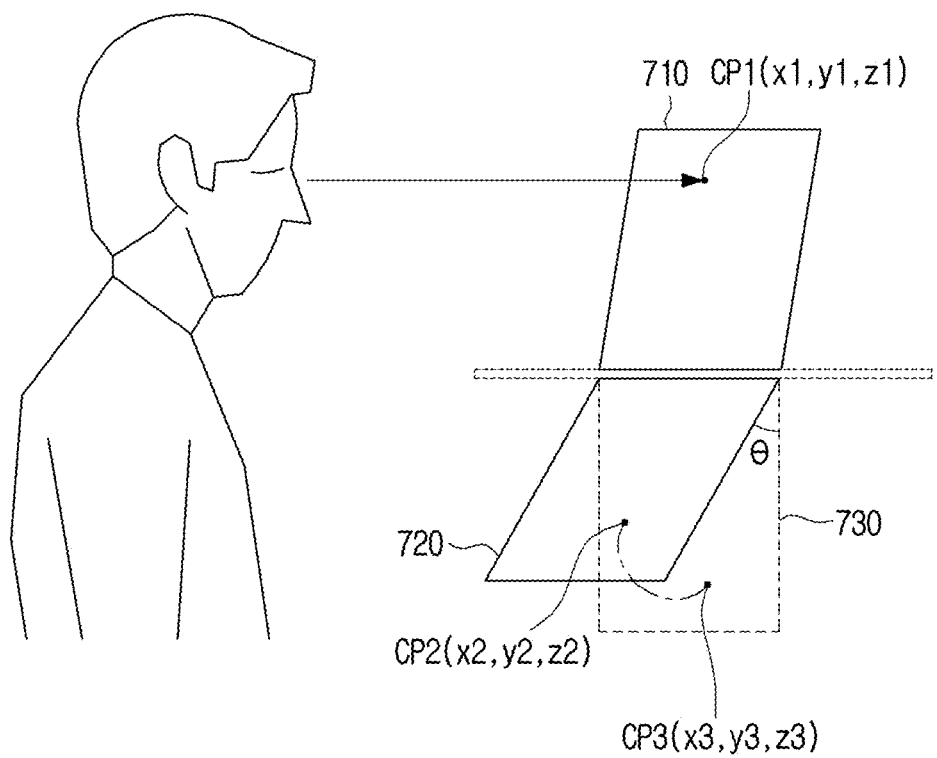
FIG. 7 illustrates a diagram for illustrating an operation of a display apparatus according to an embodiment of the disclosure.

FIG. 6 illustrates a block diagram for illustrating a display apparatus according to an embodiment of the disclosure, and FIG. 7 is a diagram for illustrating an operation of a display apparatus according to an embodiment of the disclosure. Hereinafter, explanation will be made while parts overlapping with the aforementioned explanation are omitted or abridged.

As described above, the display apparatus 100 according to an embodiment of the disclosure may include a sensor 110, a camera 120, a memory 130, a display 140, and a processor 150. Also, the processor 150 may identify an angle of the display 140 by loading a display angle measurement module 151 stored in the memory 130, and identify a user's pupil by loading a gaze direction detection module 152 stored in the memory 130. Next, the processor 150 may identify a gaze vector corresponding to the direction of the user's gaze based on the location of the identified pupil.

Referring to FIG. 7, the processor 150 may divide the display 140 into a first display 710 and a second display 720 (or, divide into a first display area and a second display area) based on the folding line of the display 140. Specifically, with the line wherein the display is folded according to rotation of a hinge as the reference axis, the processor 150 may identify a display 710 located in the upper part of the reference axis and a display 720 located in the lower part of the reference axis.

Next, the processor 150 may generate a virtual flat surface perpendicular to the gaze vector based on one point of the display 710 in the upper part and the gaze vector. Specifically, the processor 150 may generate a virtual flat surface perpendicular to the gaze vector based on one pixel among a plurality of pixels included in the display 710 in the upper part and the gaze vector. As an example, in a case in which one point of the display 710 in the upper part is CP 1 (x1, y1, z1) as illustrated in FIG. 7, and the gaze vector is (a, b, c), the processor 150 may generate a virtual flat screen 730 expressed by a flat surface equation such as a(x−x1)+b(y−y1)+c(z−z1)=0.

Next, the processor 150 may project a content to be displayed on the display 720 in the lower part to the virtual flat screen 730 based on the angle of the display 140.

For this, the processor 150 may identify the angle θ between the display 720 in the lower part and the virtual flat screen 730. Specifically, the processor 150 may identify a difference between an angle when the display 140 is in a flat state and an angle when the display 140 is in a folded state as the angle between the display 720 in the lower part and the virtual flat screen 730. As an example, in a case in which the angle of the display 140 is α, the processor 150 may identify (180−α) degree as the angle θ between the display 720 in the lower part and the virtual flat screen 730.

Next, the processor 150 may project a content to be displayed on the display 720 in the lower part to the virtual flat screen 730 based on a rotation matrix. Here, the rotation matrix may be expressed as below.

$$\begin{pmatrix} x' \\ y' \\ z' \end{pmatrix} = \begin{pmatrix} 1 & 0 & 0 \\ 0 & \cos(\theta) & -\sin(\theta) \\ 0 & \sin(\theta) & \cos(\theta) \end{pmatrix} \begin{pmatrix} x \\ y \\ z \end{pmatrix}$$

(Here, (x', y', z') is one point of the virtual flat screen 730, (x, y, z) is one point of the display 720 in the lower part, and θ is the angle between the display 720 in the lower part and the virtual flat screen 730.)

As an example, as illustrated in FIG. 7, if one point of the display 720 in the lower part is CP 2 (x2, y2, z2), the processor 150 may project a content to be displayed on the CP 2 to the CP 3 (x3, y3, z3) point which is a point identified based on the aforementioned rotation matrix among the entire areas of the virtual flat screen 730. That is, if the CP 2 point is one pixel, the processor 150 may identify a pixel value corresponding to a content to be displayed on the CP 2 point, and project the identified pixel value to the CP 3 point among the entire areas of the virtual flat screen 730; and in a case in which the CP 2 point is a block including a plurality of pixels, the processor 150 may identify a plurality of pixel values corresponding to a content to be displayed on the CP 2 point, and project the plurality of identified pixel values to the CP 3 point among the entire areas of the virtual flat screen 730.

Figure 8A:
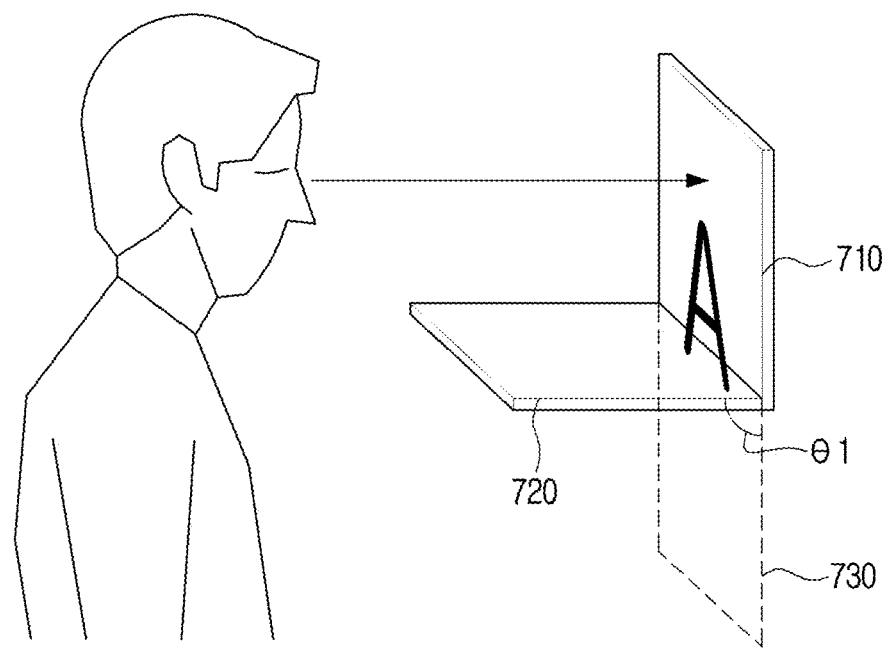
FIG. 8A illustrates a diagram for illustrating an embodiment of projecting a content to a virtual flat screen according to an embodiment of the disclosure.
Figure 8B:
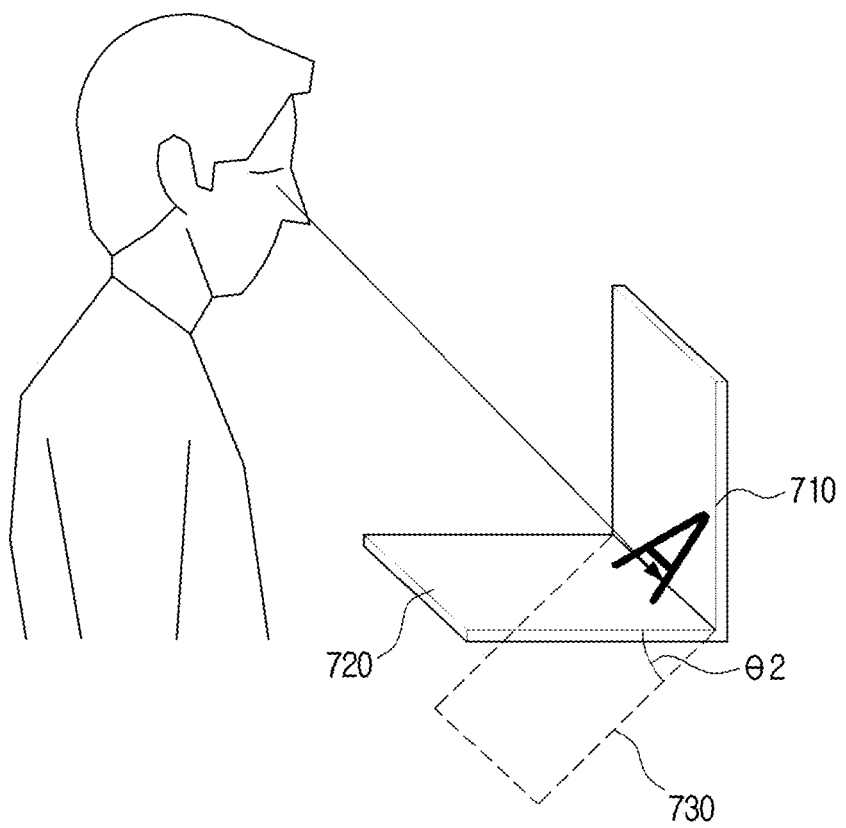
FIG. 8B illustrates a diagram for illustrating an embodiment of projecting a content to a virtual flat screen according to an embodiment of the disclosure.

As an example, as illustrated in FIG. 8A, in a case in which the angle between the display 720 in the lower part and the virtual flat screen 730 is θ1, the processor 150 may project a content to be displayed on the display 720 in the lower part to the virtual flat screen 730 generated in a location rotated by the angle θ1 with the folding line as the reference axis. As illustrated in FIG. 8B, in a case in which the angle between the display 720 in the lower part and the virtual flat screen 730 is θ2, the processor 150 may project a content to be displayed on the display 720 in the lower part to the virtual flat screen 730 generated in a location rotated by the angle θ2 with the folding line as the reference axis.

In FIG. 7, it was illustrated that a content to be displayed on one point CP 2 of the display 720 in the lower part is projected to the virtual flat screen 730, but it can be deemed that the processor 150 may project contents to be displayed on each of the plurality of points of the display 720 in the lower part to each of the plurality of points of the virtual flat screen 730.

Next, the processor 150 may render the virtual flat screen 730, wherein contents are projected to each of the plurality of points, and display the rendered virtual flat screen 730 on the display 140. That is, as in FIG. 8A and FIG. 8B, in a case in which a content to be displayed on the display 720 in the lower part is projected to the virtual flat screen 730, the processor 150 may render the virtual flat screen 730 to which the content is projected, and display the rendered virtual flat screen 730 on the display 720 in the lower part.

Accordingly, the user may be provided with a content in an uncurved form even in a state wherein the display 140 is folded.

Meanwhile, in the above, an embodiment of projecting a content to be displayed on the display 720 in the lower part is projected to the virtual flat screen 730 was explained, but this is merely an embodiment, and it can be deemed that the aforementioned technical idea can be applied to a case wherein a content to be displayed on the display 710 in the upper part is projected to the virtual flat screen.

Figure 9:
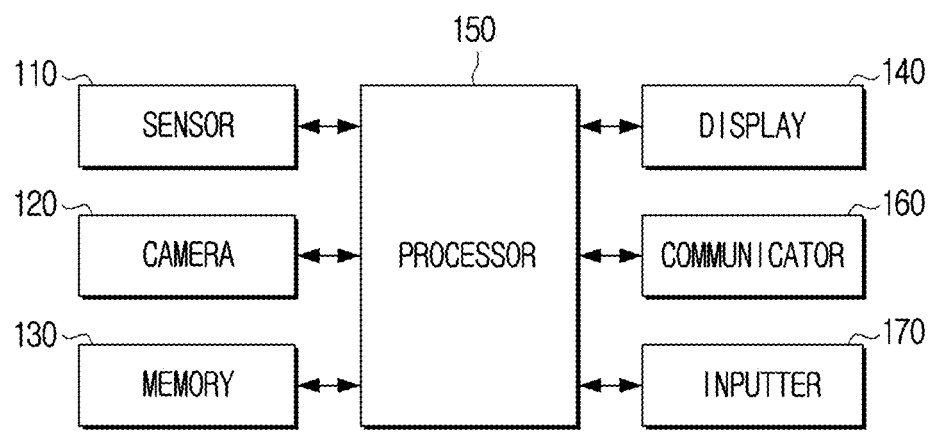
FIG. 9 illustrates a detailed block diagram for illustrating a display apparatus according to an embodiment of the disclosure.

FIG. 9 illustrates a detailed block diagram for illustrating a display apparatus according to an embodiment of the disclosure.

Referring to FIG. 9, a display apparatus according to an embodiment of the disclosure may include a sensor 110, a camera 120, a memory 130, a display 140, a communicator 160, an inputter 170, and a processor 150. Hereinafter, explanation will be made while parts overlapping with the aforementioned explanation are omitted or abridged.

The sensor 110 is a component for measuring the angle of the display 140. As an example, the sensor 110 may be implemented as an encoder as described above. However, this is merely an embodiment, and the sensor 110 may be implemented as various types such as a potentiometer that measures the angle of the display 140 based on a resistance value that changes according to the rotating angle of the display 140, a synchro sensor that measures the angle of the display 140 based on the change of the size of the voltage induced to the coil and the phase value according to the rotating angle of the display 140, etc.

The camera 120 may generate an image by photographing a subject. For example, the camera 120 may photograph a user in the front side of the display apparatus 100, and generate an image including the user. Accordingly, the processor 150 may identify the user's pupil by analyzing the image photographed by the camera 120, and identify the user's gaze vector based on the location of the identified user's pupil. Here, the gaze vector may not only be a gaze vector corresponding to the left eye of the user, but also a gaze vector corresponding to the right eye.

The camera 120 as described above may be arranged on the panel on the center upper side of the display apparatus 100, but the disclosure is not necessarily limited thereto, and the camera 120 may be arranged in various locations such as the panel on the center lower side, the panel on the center left side, or the panel on the center right side, etc. of the display apparatus 100.

Meanwhile, the image photographed by the camera 120 may be stored in the memory 130.

The memory 130 may store an operating system (OS) for controlling the overall operations of the components of the display apparatus 100 and instructions or data related to the components of the display apparatus 100.

Accordingly, the processor 150 may control a plurality of hardware or software components of the display apparatus 100 by using various instructions or data stored in the memory 130, and load instructions or data received from at least one among the other components on a volatile memory and process them, and store various data in a non-volatile memory.

In particular, the memory 130 may store information on correction coefficients. Accordingly, the processor 150 may correct the size of a content based on information on correction coefficients wherein different correction coefficients are matched for each distance between the virtual flat screen and the display 140, and project the content having the corrected size to a virtual space.

Also, the memory 130 may store information on an object recognition algorithm or an artificial intelligence model that can identify an object (e.g., a pupil) included in an image. Here, an artificial intelligence model may be a convolutional neural network (CNN) model including a convolutional layer extracting characteristic information of an image and a fully connected layer trained to identify an object included in an image based on the extracted characteristic information, but is not necessarily limited thereto.

The display 140 may display various images. Here, an image is a concept including at least one of a still image or a moving image, and the display 140 may display various images such as a multimedia content, a game content, etc. Also, the display 140 may display various kinds of user interfaces (UIs) and icons.

In particular, the display 140 may display a content projected to a virtual flat screen generated in a direction perpendicular to the direction of a user's gaze.

The display 140 as described above may be implemented as displays in various forms such as a liquid crystal display (LCD) panel, light emitting diodes (LED), organic light emitting diodes (OLED), Liquid Crystal on Silicon (LCoS), Digital Light Processing (DSP), etc. Also, in the display 140, a driving circuit that may be implemented in forms such as an a-si TFT, a low temperature poly silicon (LTPS) TFT, an organic TFT (OTFT), etc., a backlight unit, and the like may also be included.

The communicator 160 may perform communication with various external apparatuses, and transmit and receive various data. As an example, the communicator 160 may be communicatively connected with external apparatuses through various communication methods such as Wi-Fi, Bluetooth, etc., and transmit and receive various data to and from external apparatuses. For this, the communicator 160 may include a Wi-Fi module, a Bluetooth module, and a mobile communication module.

The inputter 170 may receive inputs of various user instructions. The processor 150 may execute a function corresponding to a user instruction input through the inputter 170.

As an example, the inputter 170 may receive a user input for folding, and the processor 150 may fold the display 140 based on the user input. Here, the user input for folding may not only be a user input of pushing a button provided on the display apparatus 100, but also a user input of touching a UI for folding displayed on the display 140.

Also, the inputter 170 may receive a user instruction for projecting a content. In this case, the processor 150 may project a content to a virtual flat screen based on the user instruction, render the virtual flat screen, and display the screen on the display 140.

For this, the inputter 170 may be implemented as an input panel. An input panel may be implemented as a touch pad type, a keypad type including various kinds of function keys, number keys, special keys, character keys, etc., or a touch screen type.

The microphone (not shown) may receive a user voice. Here, a user voice may be a voice for executing a specific function of the display apparatus 100. When a user voice is received through the microphone (not shown), the processor 150 may analyze the user voice through a speech to text (STT) algorithm, and perform a function corresponding to the user voice.

As an example, if a user voice for projecting a content is received through the microphone (not shown), the processor 150 may project a content to a virtual flat screen based on the user voice, render the virtual flat screen, and display the screen on the display 140.

FIG. 10 illustrates a flow chart for illustrating an operation of a display apparatus according to an embodiment of the disclosure.

The display apparatus 100 may generate a virtual flat screen 145 based on the angle of the display 140 at operation S1010. Specifically, the display apparatus 100 may set the coordinates of the four points 141, 142, 143, 144 including the reference point 141 based on the angle of the display 140 and the horizontal and vertical lengths of the display 140, and generate a virtual flat screen 145 based on the coordinates of the four points.

Next, the display apparatus 100 may correct the size of a content based on the distance between the virtual flat screen 145 and the display 140 at operation S1020. Specifically, the display apparatus 100 may correct the size of a content based on information on correction coefficients wherein different correction coefficients are matched for each distance between the virtual flat screen 145 and the display 140.

Next, the display apparatus 100 may project the corrected content to a virtual space at operation S1030, and map the content projected to the virtual space to the virtual flat screen 145 at operation S1040. Specifically, the display apparatus 100 may map the content projected to the virtual space to the virtual flat screen 145 based on a curved surface-flat surface mapping algorithm. Here, the curved surface-flat surface mapping algorithm is an algorithm for converting a three-dimensional curved surface to a two-dimensional flat surface, and it may be a parameterization polygonal mesh algorithm. However, this is merely an embodiment, and the display apparatus 100 may convert a three-dimensional curved surface to a two-dimensional flat surface through various algorithms such as a shape-preserving parameterization algorithm, etc.

Next, the display apparatus 100 may render the virtual flat screen 145 to which the content is mapped at operation S1050, and display the rendered virtual flat screen 145 at operation S1060.

Accordingly, a user may be provided with a content in an uncurved form even in a state wherein the display 140 is folded.

FIG. 11 illustrates a flow chart for illustrating an operation of a display apparatus according to an embodiment of the disclosure.

The display apparatus 100 may identify a gaze vector based on the direction of a user's gaze included in an image photographed through the camera 120 at operation S1110. Specifically, the direction of the user's gaze is a direction which a virtual line connecting from the center point of the eyeball to the center point of the pupil is toward, and the display apparatus 100 may calculate a point which proceeded toward the inside of the eyeball from the point wherein the user's pupil is located as much as the radius of the eyeball as the center point of the eyeball, and acquire a virtual line connecting from the center point of the eyeball to the center point of the user's pupil as the gaze vector of the user.

Next, the display apparatus 100 may divide the display 140 into a first display 710 and a second display 720 based on the line wherein the display 140 is folded at operation S1120, and generate the virtual flat screen 145 perpendicular to the gaze vector based on one point of the first display 710 and the gaze vector at operation 51130.

Specifically, the display apparatus 100 may identify a difference between an angle when the display 140 is in a flat state and an angle when the display 140 is in a folded state as the angle between the second display 720 and the virtual flat screen 730. As an example, if the angle of the display 140 is α, the display apparatus 100 may identify (180−α) degree as the angle θ between the second display 720 and the virtual flat screen 730. However, this is merely an embodiment, and the display apparatus 100 may identify (the corrected reference angle−α) degree as the angle θ between the second display 720 and the virtual flat screen 730. Here, the corrected reference angle may be the angle when the display 140 is in a flat state.

Next, the display apparatus 100 may generate the virtual flat screen 730 in a location wherein the second display 720 was rotated by the angle θ based on the folding line.

Next, the display apparatus 100 may project a content to be displayed on the second display to the virtual flat screen based on the angle of the display at operation S1140. That is, the display apparatus 100 may identify the angle θ between the second display 720 and the virtual flat screen 730 based on the angle of the display, and project a content to be displayed on the second display to the virtual flat screen based on the rotation matrix.

Next, the display apparatus 100 may render the virtual flat screen to which the content is projected at operation S1150, and display the rendered virtual flat screen at operation S1160.

Accordingly, a user may be provided with a content in an uncurved form even in a state wherein the display 140 is folded.

Meanwhile, the methods according to the various embodiments of the disclosure as described above may be implemented in forms of software or applications that can be installed on conventional display apparatuses.

Also, a non-transitory computer readable medium storing a program that sequentially performs the control method of a display apparatus according to the disclosure may be provided.

A non-transitory computer readable medium refers to a medium that stores data semi-permanently, and is readable by machines, but not a medium that stores data for a short moment such as a register, a cache, and a memory. Specifically, the aforementioned various applications or programs may be provided while being stored in a non-transitory computer readable medium such as a CD, a DVD, a hard disk, a blue-ray disk, a USB, a memory card, a ROM and the like.

Although the present disclosure has been described with various embodiments, various changes and modifications may be suggested to one skilled in the art. It is intended that the present disclosure encompass such changes and modifications as fall within the scope of the appended claims.

What is claimed is:

1. A display apparatus comprising:
a sensor;
a display; and
a processor coupled to the sensor and the display, wherein the processor is configured to:
generate a virtual flat screen based on an angle of the display identified through the sensor,
correct a size of a content based on a distance between the virtual flat screen and the display,
project the corrected content to a virtual space,
map the content projected to the virtual space to the virtual flat screen,
render the virtual flat screen based on the mapped content, and
display the rendered virtual flat screen on the display.

2. The display apparatus of claim 1, further comprising:
a camera, and
wherein the processor is further configured to:
identify a user's pupil in an image photographed through the camera,
identify a direction of a user's gaze based on a location of the identified user's pupil, rotate the virtual flat screen that the content is mapped in a direction perpendicular to the direction of the user's gaze,
render the rotated virtual flat screen, and
display the rendered rotated virtual flat screen on the display.

3. The display apparatus of claim 2, wherein the processor is further configured to:
based on a gaze vector corresponding to the direction of the user's gaze, identify a first vector perpendicular to the gaze vector,
based on the first vector and a second vector corresponding to the virtual flat screen, identify the angle between the first and second vectors, and
rotate the virtual flat screen based on the angle between the first and second vectors.

4. The display apparatus of claim 3, wherein the processor is further configured to:
based on the angle between the first and second vectors being an angle exceeding a predetermined angle in the direction wherein the user's pupil was identified based on the second vector, rotate the virtual flat screen in the direction wherein the user's pupil was identified, and
based on the angle between the first and second vectors being an angle exceeding a predetermined angle in an opposite direction to the direction wherein the user's pupil was identified based on the second vector, rotate the virtual flat screen in the opposition direction to the direction wherein the user's pupil was identified.

5. The display apparatus of claim 1, wherein the processor is further configured to:
identify a rotating direction of the display based on a plurality of pulse signals of different phases received from the sensor, and
identify the angle of the display based on the rotating direction and a number of pulse signals received from the sensor.

6. The display apparatus of claim 1, wherein the processor is further configured to:
based on a coordinate of a first point of the display, identify coordinates of second to fourth points using the angle of the display, a horizontal length of the display, and a vertical length of the display, and
generate the virtual flat screen based on the coordinates of the first to fourth points.

7. The display apparatus of claim 1, wherein the processor is further configured to:

identify a distance from the virtual flat screen to the display located in a vertical direction of the virtual flat screen, and correct the size of the content based on information on the identified distance and correction coefficients, wherein different correction coefficients are matched for each distance.

8. The display apparatus of claim 7, wherein the processor is further configured to:

correct the content to be larger as a distance value from the virtual flat screen to the display becomes larger.

9. The display apparatus of claim 1, wherein the virtual space that the corrected content is projected is a three-dimensional space having a form of a curved surface, and wherein the processor is further configured to:

map the content projected to the three-dimensional space having the form of a curved surface to the virtual flat screen having a form of a two-dimensional flat surface based on a curved surface-flat surface mapping algorithm.

10. A control method of a display apparatus, the method comprising:

generating a virtual flat screen based on an angle of a display;

correcting a size of a content based on a distance between the virtual flat screen and the display;

projecting the corrected content to a virtual space;

mapping the content projected to the virtual space to the virtual flat screen;

rendering the virtual flat screen that the content is mapped to; and displaying the rendered virtual flat screen on the display.

11. The control method of claim 10, further comprising:

photographing a user, and wherein the displaying comprises:

identifying a user's pupil in the photograph, identifying a direction of a user's gaze based on a location of the identified user's pupil, rotating the virtual flat screen that the content is mapped to in a direction perpendicular to the direction of the user's gaze, and rendering the rotated virtual flat screen and displaying the rendered rotated virtual flat screen on the display.

12. The control method of claim 11, wherein the rotating comprises:

based on a gaze vector corresponding to the direction of the user's gaze, identifying a first vector perpendicular to the gaze vector, and based on the first vector and a second vector corresponding to the virtual flat screen, identifying the angle between the first and second vectors, and rotating the virtual flat screen based on the angle between the first and second vectors.

13. The control method of claim 10, wherein identifying the angle comprises:

identifying a rotating direction of the display based on a plurality of pulse signals of different phases received from a sensor, and identifying the angle of the display based on the rotating direction and a number of pulse signals received from the sensor.

14. The control method of claim 10, wherein the generating comprises:

based on a coordinate of a first point of the display, identifying coordinates of second to fourth points using the angle of the display, a horizontal length of the display, and a vertical length of the display, and generating the virtual flat screen based on the coordinates of the first to fourth points.

15. The control method of claim 10, wherein the correcting comprises:

identifying a distance from the virtual flat screen to the display located in a vertical direction of the virtual flat screen, and correcting the size of the content based on information on the identified distance and correction coefficients, wherein different correction coefficients are matched for each distance.

16. The control method of claim 15, wherein the correcting comprises:

correcting the content to be larger as a distance value from the virtual flat screen to the display becomes larger.

17. The control method of a display apparatus of claim 10, wherein the virtual space that the corrected content is projected is a three-dimensional space having a form of a curved surface, and wherein the mapping comprises:

mapping the content projected to the three-dimensional space having a form of a curved surface to the virtual flat screen having a form of a two-dimensional flat surface based on a curved surface-flat surface mapping algorithm.

* * * * *